Figure 4:
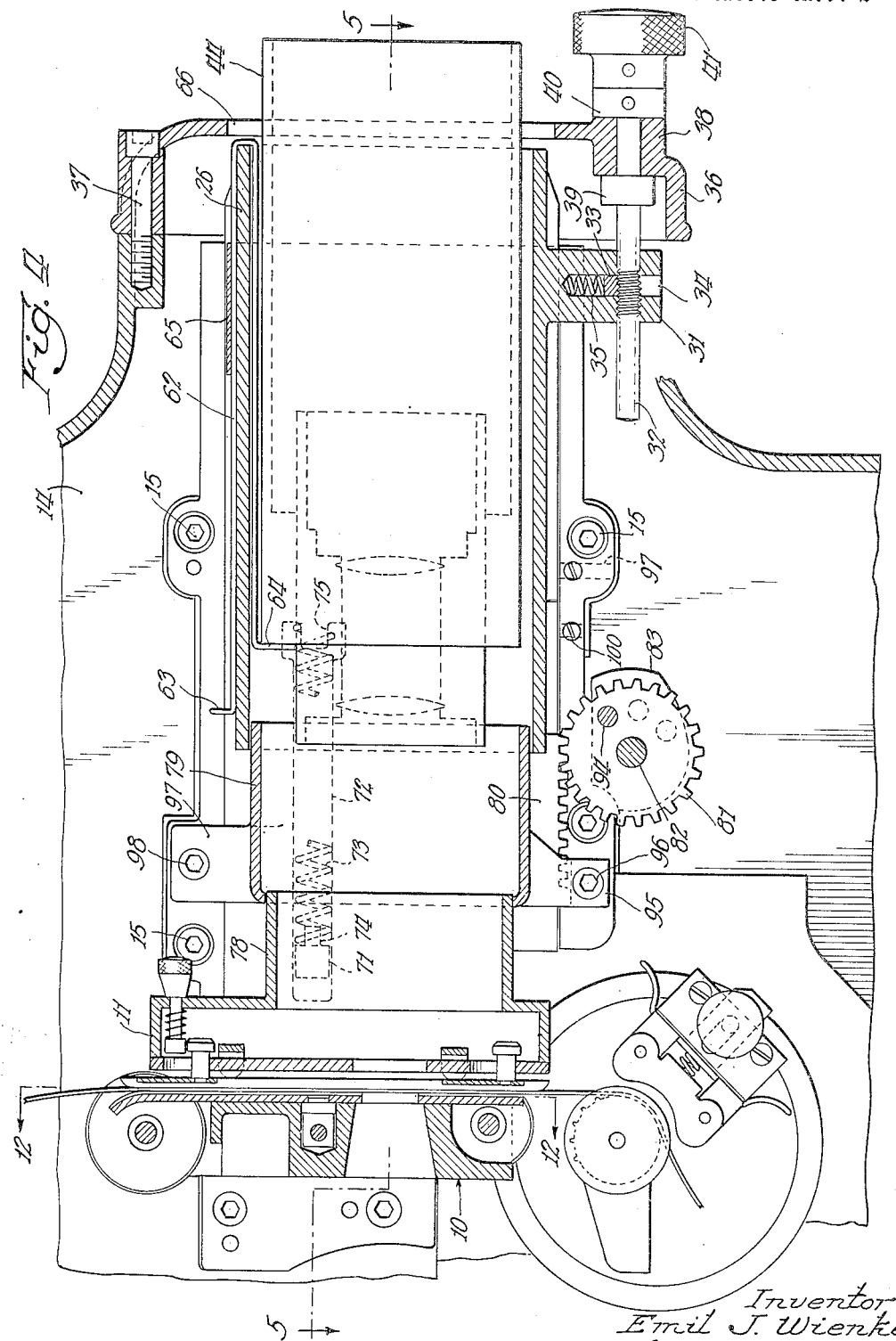

May 9, 1950     E. J. WIENKE     2,506,948
LENS MOUNT MEANS FOR MOTION-PICTURE PROJECTORS
Filed Feb. 15, 1946     4 Sheets-Sheet 1
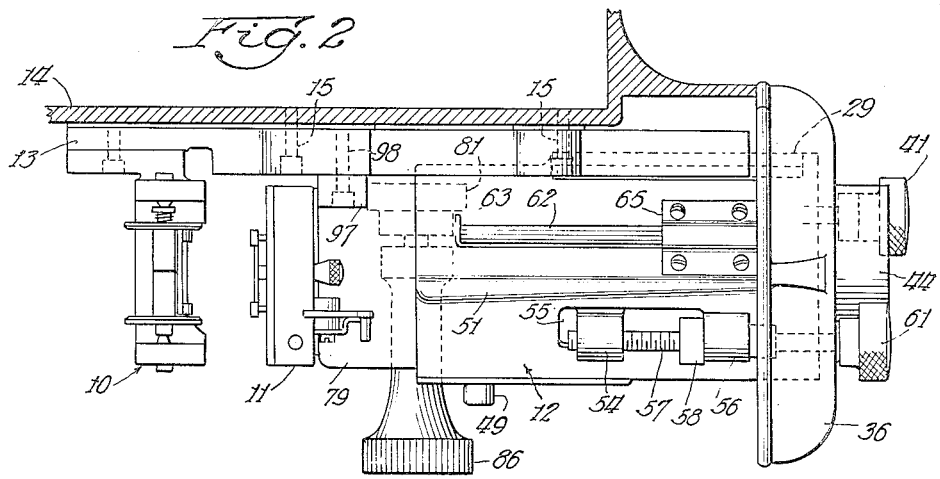
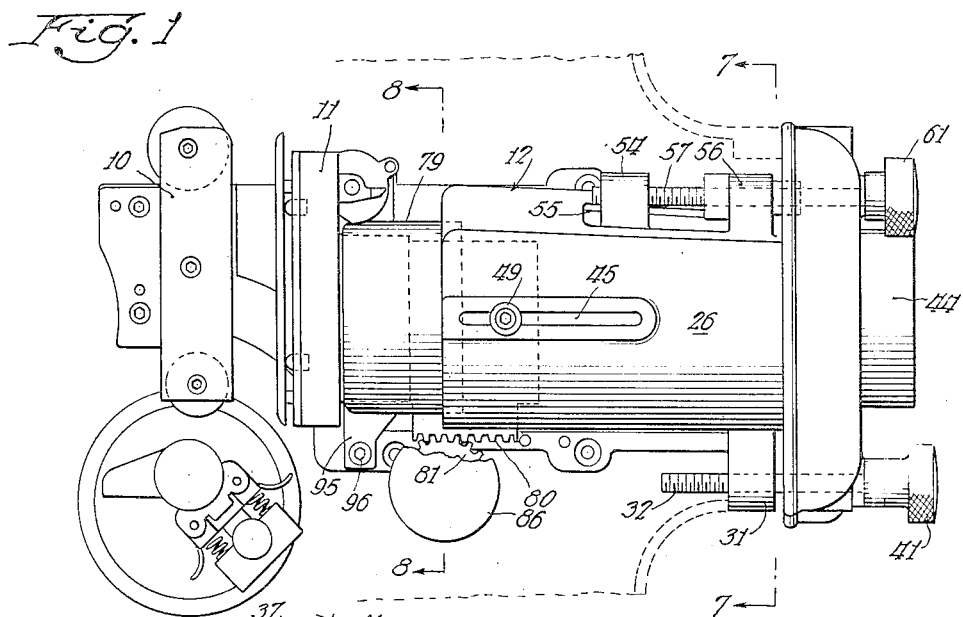
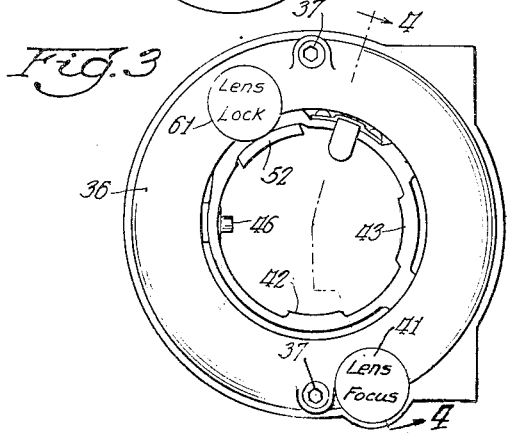
Inventor:
Emil J. Wienke May 9, 1950 E. J. WIENKE 2,506,948
LENS MOUNT MEANS FOR MOTION-PICTURE PROJECTORS
Filed Feb. 15, 1946 4 Sheets-Sheet 2

Inventor:
Emil J. Wienke
By: Creek Wells Atty.

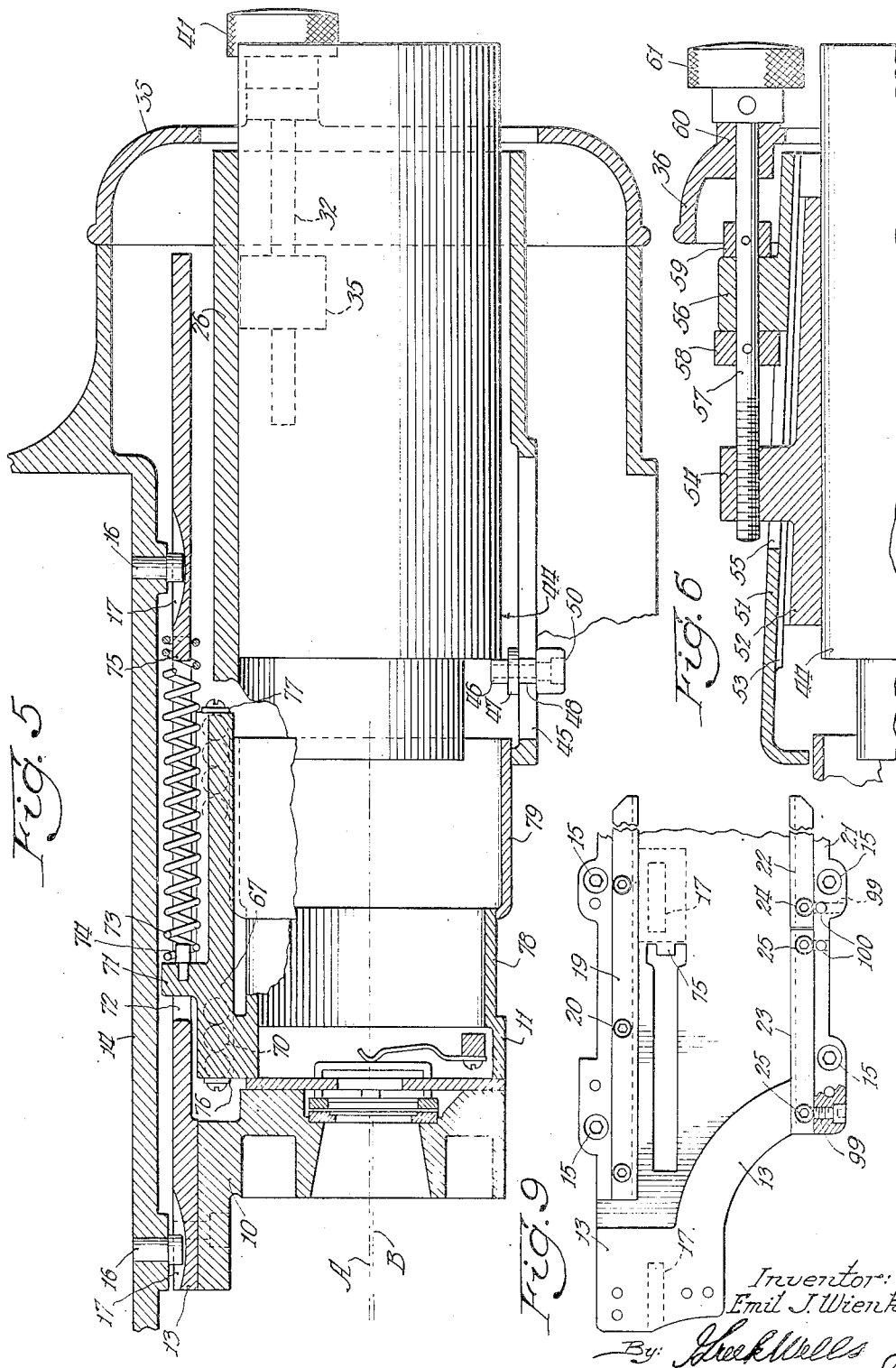

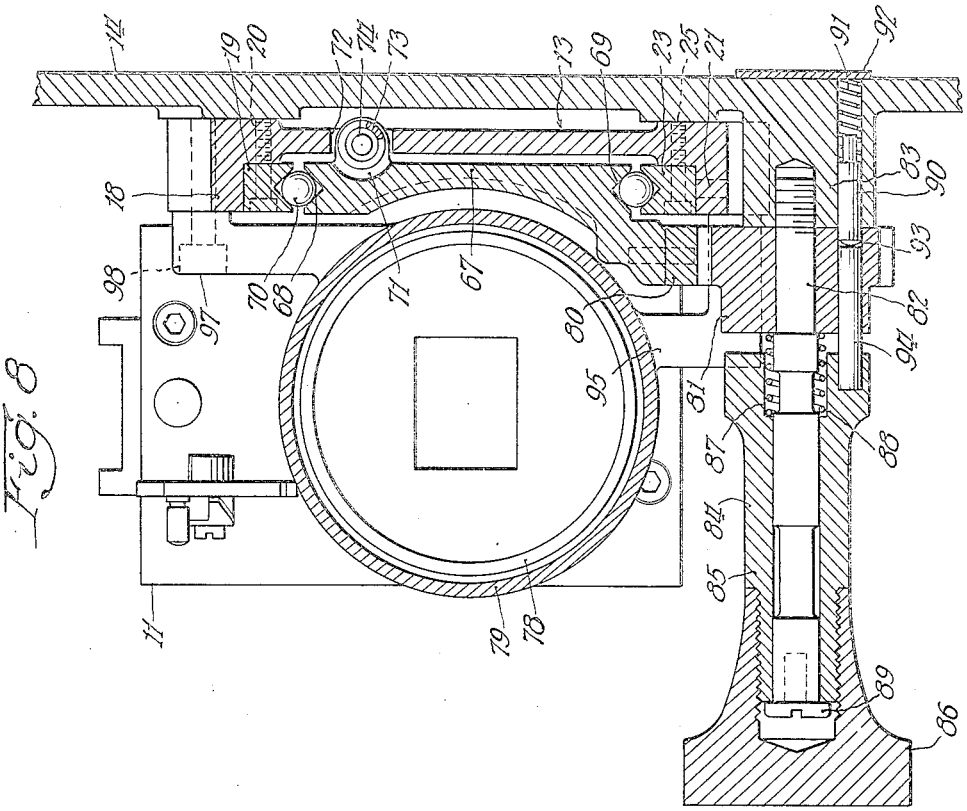
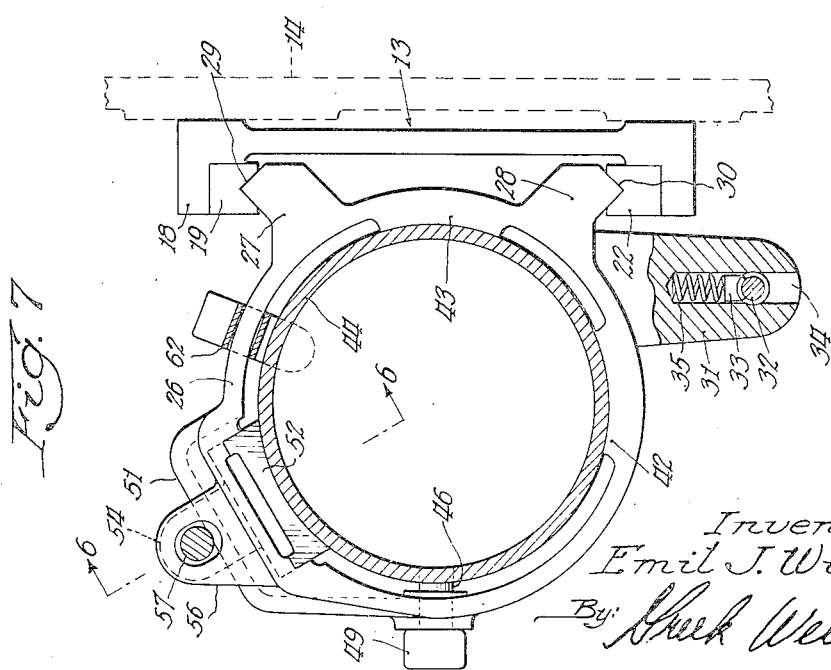

Patented May 9, 1950

2,506,948

UNITED STATES PATENT OFFICE 2,506,948

LENS MOUNT MEANS FOR MOTION-PICTURE PROJECTORS

Emil J. Wienke, Glen Ellyn, Ill., assignor to Motiograph, Chicago, Ill., a limited partnership of Illinois Application February 15, 1946, Serial No. 647,937

14 Claims. (Cl. 88—24)

1

The present invention relates to improvements in the lens mount of a motion picture projector whereby the lens barrel may be positioned and locked in place with extreme accuracy and thereafter adjusted or focused with a minimum amount of difficulty.

It is a purpose of the invention to provide a novel unit construction whereby the lens mount, a support for the film track and aperture plate, and a tension shoe support are carried upon a single assembly base which is fastened to the projector housing, the construction being such that the several parts mentioned may be taken out of the projector housing as a unit with a minimum amount of difficulty. This construction contemplates guide tracks for both the lens mount and the tension shoe support whereby one guide track is fixed for both the shoe support and the lens mount, and opposed guide tracks separately adjustable are provided for the tension shoe support and the lens mount.

It is also a purpose of my invention to provide an improved focusing mechanism for the lens which embodies an adjustable stop in the wall of the lens mount for the lens barrel which, when the lens barrel is once inserted and locked in place, makes it unnecessary to further touch the lens barrel or to change the position of the lens with respect to the barrel. The construction contemplates also, a simple screw adjustment by which the lens barrel mount can be moved along accurately positioned guide shoes, the screw being journaled in the projection housing and threaded through a lug on the lens mount.

It is a further purpose of this invention to provide a novel lens barrel lock for locking the lens barrel in the lens mount so as to insure accurate alignment of the lens barrel. The construction is such that the lock can be operated from the exterior of the projector by an operating rod so that once the barrel is positioned against the stop in the lens barrel mount, it can be wedged in place to prevent any possibility of its moving thereafter.

It is a further purpose of my invention to provide a novel lens ejector device by which the lens barrel may be ejected from the mount.

The nature and advantages of my invention will appear more fully from the following description and the accompanying drawings wherein a preferred form of the invention is shown. It should be understood however, that the drawings and description are illustrative only and are not to be taken as limiting the invention except insofar as it is limited by the claims.

In the drawings:

Figure 1 is a view in side elevation of the assembly base lens mount and tension shoe support together with the film aperture plate and cooperating parts,

2

Figure 2 is a plan view of the mechanism shown in Figure 1, certain parts being left out for clearness, and the projector housing being shown in section, Figure 3 is an end view of the lens mount as viewed from the right hand end of Figure 1, Figure 4 is a sectional view taken substantially on the line 4—4 of Figure 3, Figure 5 is a sectional view taken on the line 5—5 of Figure 4 (showing in addition the spring for advancing the tension shoe support which is slightly above the section line 5—5), Figure 6 is a fragmentary sectional view taken on the line 6—6 of Figure 7 and showing the lens lock, Figure 7 is a sectional view on the line 7—7 of Figure 1, Figure 8 is a sectional view on the line 8—8 of Figure 1, and Figure 9 is a fragmentary view in side elevation of the assembly base for the lens mount and the tension shoe support.

Referring now to the drawings, my invention is applied to a motion picture projector and is particularly concerned with the parts of the projector which mount the lens and the tension shoe which presses the film against the aperture plate. As shown by Figures 1 and 2, the aperture plate mechanism 10, the film tension shoe support 11, and the lens mounting and adjusting mechanism 12 are all carried by an assembly base casting 13. Since the details of the aperture plate mechanism and of the tension shoe operating mechanism are covered by separate applications, they will not be described herein. However, the base casting 13 provides guide means for movably supporting the tension shoe support and the lens barrel mount so that they may be moved toward and away from the aperture plate with no danger of getting out of line. The assembly base is secured to the projector housing 14 by a series of four screws 15. (See Figure 9.) The housing has two spaced pins 16 (see Figure 5) which are utilized to align the base casting 13. The casting is provided with accurately milled recesses 17 to receive the heads of the pins 16 as a further means of insuring accurate alignment of the base casting.

Referring now to Figures 8 and 9, particularly, the casting 13 has a top flange 18 against which I mount an inverted V-shaped guide 19, the guide being held in place by screws 20. At its lower edge, the casting 13 has another flange 21 over which two V-shaped guides 22 and 23 are mounted. The guides 22 and 23 are clamped to the base 13 by screws 24 and 25 respectively. It will be noted from the drawings, and particularly Figure 8, that there is a slight amount of play of the screws 20—24 and 25 in the guides 19—22 and 23, so that the guide 19 can be positioned solidly against the flange 18, and the guides 22 and 23 can be adjusted slightly to hold them in position at the proper distance from the guide 19. The guide 22 supports the lens barrel mount while the guide 23 supports the film tension shoe support, and in the event that one should wear more than the other, the separate individual adjustment will take care of them.

The lens barrel mount comprises a shell 26 which has two guide lugs 27 and 28 thereon. (See Figure 7.) These lugs have V-shaped portions 29 and 30 respectively which portions are accurately machined to engage the V-shaped guides 19 and 22.

The shell 26 also has a depending lug 31 (see Figures 4 and 7) which is apertured to receive a focusing screw 32. The screw 32 is threaded, and within the lug 31 a spring pressed threaded block 33 is mounted to engage the threads of the screw 32. The lug 31 has an aperture 34 for the threaded block, and the aperture is extended upwardly into the lug to provide space for a spring 35 that furnishes the tension on the screw 32 to maintain the focusing screw in any desired adjustable position. The focusing screw is mounted in a circular cap 36 which is mounted on the projector housing by screws 37, so that it can be easily removed. This cap has a boss at 38, and the screw 32 has two collars 39 and 40 thereon, the boss being apertured for the screw to pass through it, and the collars being mounted to engage the opposite machined faces of the boss. A knurled head 41 is provided on the screw 32.

The lens mount 26 has two inwardly projecting shallow ribs 42 and 43 which are machined to provide a guide surface for a lens barrel 44. The lens mount also has a slot 45 in the side opposite the lugs 27 and 28. This slot serves to mount an adjustable lens barrel stop 46. The stop has a flange 47 on the inside of the slot 45, and a neck portion 48 riding in the slot. A head 49 engages the outer faces of the lens mount around the slot 45, and a screw 50 is threaded into the stop 46 so as to clamp the head 49 in position. The function of the stop 46 is to provide a means of presetting the lens barrel 44 with respect to the lens mount 26, so that when the lens barrel is inserted against the stop and locked in place, there is no further necessity to disturb the lens barrel since the focusing is thereafter done by moving the entire lens mount. If it becomes necessary at any time to remove the lens barrel, the lock, which will hereinafter be described, is released so that the barrel can be taken out, and when it is replaced the stop will serve to accurately position it again without further adjustment.

The lens barrel lock is shown best in Figures 1, 6 and 7. It will be noted that the lens mount shell 26 is formed with an upwardly and outwardly sloping wall portion 51. This sloping portion forms a guide for a slide 52 which has one face machined to engage the surface 53 of the portion 51, and the opposite surface machined to engage the lens barrel 44. The slide 52 has a lug 54 formed thereon, and this lug extends through a slot 55 in the portion 51. The portion 51 also has a lug 56 projecting outwardly therefrom, and this lug is apertured to receive a screw threaded rod 57 by which the slide 52 is operated. Two collars 58 and 59 are pinned to the rod 57 so as to prevent endwise play of the rod with respect to the lens mount. The threaded end of the rod extends through the lug 54 which is threaded to receive it. The other end of the rod 57 extends through a boss 60 in the cap 36. A knurled head 61 is provided on the rod 57 for rotating it. When the lens barrel is placed in the mount 26, and shoved against the stop pin 46, it can be readily locked in place by turning the rod 57 to move the slide 52 to the right, as in Figure 6. This will clamp the lens barrel solidly against the machined surfaces of the ribs 42 and 43, and hold the lens barrel in place.

In order to facilitate removal of the lens barrel, I provide an ejector strip 62 which is shown best in Figures 2, 4 and 7. This ejector comprises an elongated U-shaped metal strip which has an upturned end 63 and a downturned end 64. The downturned end 64 hooks over the forward end of the lens barrel in the manner shown in Figure 4. A strap 65 is secured on the lens mount 26 so as to overlie the ejector 62. When it is desired to move the lens out the operator may push the projection 63 to the right as shown in Figure 4, and this will cause the lens barrel to move to the right until the projection 63 strikes the strap 65. The barrel is then far enough out to be readily grasped by the hand. The ejector of course must be long enough to accommodate all the adjustments of the lens barrel within the lens mount. The cap 36 is cut away as shown at 66, to permit the ejector to move through it and to permit the lens mount to move through it to the extent required for the full range of adjustment of the lens mount.

The lens mount cooperates with the guides 19 and 23 in guiding the film tension shoe support 11 toward and away from the film guide and aperture plate 10. As shown best by Figures 5 and 8 of the drawings, the film tension shoe support 11 is carried by a bracket 67 which has upper and lower V-shaped grooves 68 and 69 therein. These grooves are oppositely disposed to the grooves in the guides 19 and 23, so that a series of balls 70 may be used to provide a roller bearing for the film tension shoe support. The bracket 67 has a lug 71 thereon which extends through an aperture 72 that is provided in the base casting 13. This lug forms a stop for a spring 73, and carries a pin 74 over which the end of the spring fits. The other end of the spring fits over a lug 75 that is formed at the end of the slot 72 out of the material of the base casting 13. The spring 73 is under compression so that it tends to push the film tension shoe support to the left as shown in Figure 6. The balls are held in place by suitable end plates 76 and 77 on the bracket 67. The shoe support 11 has a tubular extension 78 and a sleeve member 79 is mounted on the casting 13 so as to provide a shield between the forward end of the lens barrel and the film tension shoe. The lens mount is open at its forward end so that the member 79 telescopes inside it as illustrated in Figure 5.

The film tension shoe support 11 is adapted to be moved away from the film track and aperture unit 10 against the tension of the spring 73 by a rack 80 (see Figures 1 and 8) which is bolted to the bottom of the bracket 67, and a pinion 81. The pinion 81 is rotatably mounted on a stem 82 that is threaded into a boss 83 of the projector housing. The stem 82 projects outwardly beyond the pinion 81 to form a bearing for an operating handle 84. The operating handle is made up of two pieces 85 and 86. The piece 85 has an enlarged recess 87 receiving a spring 88 that is coiled around the stem 82, and pressed against the pinion 81. A screw 89 is threaded into the outer end of the stem 82 to hold the piece 85 in place. The hand piece 86 is threaded on the piece 85 and encloses the screw 89.

The pinion 81 can be locked in three positions against rotation by spring pressed pins 90 that are mounted in the boss 83 and backed up by springs 91. A cover plate 92 holds the springs in place. The pinion 81 has an aperture 93 extending through it into which the pins 90 project to lock the pinion against rotation. In order to release the pinion for rotation, the part 85 carries a release pin 94 that extends into the aperture 93. In the forward or tension applying position of the film shoe support, the parts are positioned as shown in Figure 4, where the upper pin 90 is engaged in the aperture 93 of the pinion. Now by pressing in on the hand piece 86, the operator can cause the pin 94 to remove the pin 90 from the aperture 93, and then he can turn the hand piece 86 to the intermediate position, or the fully retracted position against the force of the spring 73, and then allow the pin 90, at the new position, to enter the aperture 93. In this way the film tension shoe support can be held in any one of three positions. The normal use of this means for locking the film tension shoe support in closed and open position utilizes the closed and full open positions only. However, when a short focal lens is being used there is not sufficient room to back up the shoe support to its normal open position which would give the most desirable clearance between the film tension shoe and the film guide and aperture plate. In this case the intermediate position of the film tension shoe support can be used by removing the pin 90 from the outer opening and putting it in the middle opening to engage in the aperture 93 of the pinion.

It will be noted that the member 79, which is stationary with respect to the casting 13, has a downwardly extending lug 95 that extends rearwardly under a portion of the rack 80 where it is secured to the casting 13 by a screw 96. A similar projection 97 is formed on the member 79 and extends upwardly over the guide 19 where it is secured to the flange 18 by a screw 98.

Since all of the parts of the lens mount, the film tension shoe support and the film guide and aperture plate are carried by the casting 13, these parts may be assembled accurately and machined before mounting in the projector housing, and in the event of any damage to them the entire unit or either of the three parts may readily be replaced or repaired. The casting 13 provides a simple and effective means for offsetting the center line of the lens with respect to the center line of the film aperture to take care of film with a sound track. This feature is illustrated in Figure 5 of the drawings where the line A represents the center line of the lens while the line B represents the center line of the aperture plate. This offsetting is accomplished by providing a mounting surface on the casting 13 for the film guide and aperture plate unit 10, with sufficient offset to take care of the desired offset of the lens center line with respect to the center line of the aperture.

The focusing of the lens, once the lens barrel has been properly set in the lens mounting, is simply accomplished by rotating the hand piece 41 to cause the lens mount and all the parts carried thereby to move along the guides 19 and 22. Since the guide 19 is the base or reference guide, and is at the top, the principal wear can be taken up very simply by adjusting the lower guide 22 by means of the set screws such as that shown at 99. When the adjustment has been made, a lock screw 100 locks the set screw in place. In a like manner the guide 23 can be adjusted upwardly to insure alignment of the film tension shoe.

Having thus described my invention, I claim:

1. In a motion picture projector, a supporting wall, an assembly base, aligning pins and slots in the wall and base, means clamping the base to the wall with the pins in the slots, a lens barrel mount, a lens barrel therein, a film guide and aperture plate, a film tension shoe, a support for said shoe, means mounting the film guide and aperture plate on the assembly base at one end thereof, said base having upper and lower V-tracks mounted thereon for the lens mount and shoe support, cooperating V-shoes on the lens mount engaging said tracks, V-tracks on the shoe supports and ball bearings interposed between the V-tracks of the shoe and those of the base.

2. In a motion picture projector the combination of a plate adapted to be mounted in a projector housing and comprising an elongate assembly base, a lens barrel mount, a lens barrel therein, a film guide and aperture plate, a film tension shoe, a support for said shoe, means mounting the film guide and aperture plate on the assembly base at one end thereof, said base having upper and lower V-tracks mounted thereon for the lens mount and shoe support, cooperating V-shoes on the lens mount engaging said tracks, V-tracks on the shoe supports and ball bearings interposed between the V-tracks of the shoe and those of the base.

3. In a motion picture projector an elongated plate adapted to be mounted on a wall of a projector housing and having laterally extending flanges at its upper and lower edges said flanges having guide bar aligning surfaces thereon facing each other, guide bars aligned by said flanges and secured to the plate between said flanges and having guide surfaces thereon facing each other, a lens barrel mount comprising a shell having guide lugs provided with bearing portions held by said guide bars on the guide surfaces thereof, and means on one of said flanges for moving the guide bar thereon toward and away from the other guide bar.

4. In a motion picture projector an elongated plate adapted to be mounted on a wall of a projector housing and having laterally extending flanges at its upper and lower edges said flanges having guide bar aligning surfaces thereon facing each other, guide bars aligned by said flanges and secured to the plate between said flanges and having guide surfaces thereon facing each other, a lens barrel mount comprising a shell having guide lugs provided with bearing portions held by said guide bars on the guide surfaces thereof, and means for moving the shell lengthwise along said bars.

5. In a motion picture projector an elongated plate adapted to be mounted on a wall of a projector housing and having laterally extending flanges at its upper and lower edges said flanges having guide bar aligning surfaces thereon facing each other, guide bars aligned by said flanges and secured to the plate between said flanges, said guide bars having recessed guide faces thereon facing each other, a film tension shoe support including a bracket having recessed guide faces thereon opposed to the guide faces on the bars, and rolling bearing members between the opposed guide faces of the bracket and the guide bars.

6. In a motion picture projector an elongated plate adapted to be mounted on a wall of a projection housing and having laterally extending flanges at its upper and lower edges, guide bars secured to the plate between said flanges, said guide bars having recessed guide faces thereon, a film tension shoe support including a bracket having recessed guide faces thereon opposed to the guide faces on the bars, and rolling bearing members between the opposed guide faces, the bracket and the plate having spaced apart lugs thereon and a spring mounted by said lugs for urging the bracket along the guide bars.

7. In a motion picture projector an elongated plate adapted to be mounted on a wall of a projector housing and having laterally extending flanges at its upper and lower edges, guide bars secured to the plate between said flanges, said guide bars having recessed guide faces thereon, a film tension shoe support including a bracket having recessed guide faces thereon opposed to the guide faces on the bars, and rolling bearing members between the opposed guide faces, spring means connecting the bracket and the plate for urging the support in one direction and means to move the support against the force of the spring and lock it, said last named means comprising an operating handle operatively connected to the support and releasable lock means for said handle.

8. In a motion picture projector an elongated plate adapted to be mounted on a wall of a projector housing and having laterally extending flanges at its upper and lower edges, guide bars secured to the plate between said flanges, said guide bars having recessed guide faces thereon, a film tension shoe support including a bracket having recessed guide faces thereon opposed to the guide faces on the bars, and rolling bearing members between the opposed guide faces, spring means connecting the bracket and the plate for urging the support in one direction and means to move the support against the force of the spring and lock it, said last named means comprising a rack on the support, a pinion meshing therewith, an operating handle for said pinion and lock means controlled by the handle for preventing rotation of the pinion.

9. In a motion picture projector a housing, a lens barrel mount therein comprising a shell mounted on the housing for movement in a direction parallel to the light axis of the projector, said shell having at least two circumferentially spaced lens barrel guides therein, a lens barrel slidably supported in said guides, one of the guides comprising a tapered wedge, said shell having a tapered inner surface receiving the wedge, and means on the wedge and shell to move the wedge along the tapered shell surface to lock the barrel in place.

10. In a motion picture projector a housing, a lens barrel mount therein comprising a shell mounted on the housing for movement in a direction parallel to the light axis of the projector, said shell having at least two circumferentially spaced lens barrel guides therein, a lens barrel slidably supported in said guides, one of the guides being adjustable to lock the barrel against movement, said shell also having a slot therein extending lengthwise of the barrel and a stop pin adjustably mounted in the slot and projecting inwardly into the path of the barrel.

11. In a motion picture projector a housing, a lens barrel mount therein comprising a shell mounted on the housing for movement in a direction parallel to the light axis of the projector, said shell having at least two circumferentially spaced lens barrel guides therein, a lens barrel slidably supported in said guides, one of the guides being adjustable toward the barrel to lock it against movement, a lug on the shell, a spring pressed threaded block in the shell and a focusing screw journalled in the housing and extending through the shell and having threads operatively engaging said block for moving the shell.

12. In a motion picture projector a housing, a lens barrel mount therein comprising a shell mounted on the housing for movement in a direction parallel to the light axis of the projector, said shell having at least two circumferentially spaced lens barrel guides therein, a lens barrel slidably supported in said guides, one of the guides being adjustable toward the barrel to lock it against movement, and a lens barrel remover comprising an elongated U-shaped metal strip slidably secured on the shell and having an inturned end for engaging the inner end of the barrel.

13. In a motion picture projector a housing, a lens barrel mount therein comprising a shell mounted on the housing for movement in a direction parallel to the light axis of the projector, said shell having at least two circumferentially spaced lens barrel guides therein, a lens barrel slidably supported in said guides, one of the guides being adjustable toward the barrel to lock it against movement, a lug on the shell, a spring pressed threaded block in the shell and a focusing screw journalled in the housing and extending through the shell and having threads operatively engaging said block for moving the shell, said shell also having an adjustable stop pin therein limiting the inward movement of the barrel.

14. In a motion picture projector, the combination of an assembly base with a lens barrel mount, a lens barrel therein, a film guide and aperture plate, a film tension shoe, a support for said shoe, means mounting the film guide and aperture plate on the assembly base at one end thereof, said base having an upper guide surface thereon and two lower separate guide bars thereon for the lens mount and shoe support, guide lugs on the lens mount having bearing portions held by said guide surface and one of said bars, said shoe support including a bracket provided with guide faces opposed to the upper guide surface and to the other guide bar, rolling bearing members interposed between said guide faces and the guide surface and guide bar respectively, and means individual to each bar for adjusting the guide bars toward the guide surface.

EMIL J. WIENKE.

REFERENCES CITED

The following references are of record in the file of this patent:

UNITED STATES PATENTS

| Number | Name | Date |
| --- | --- | --- |
| 1,075,692 | Cannock | Oct. 14, 1913 |
| 1,773,575 | Dina | Aug. 19, 1930 |
| 1,907,753 | Dina | May 9, 1933 |
| 2,029,938 | Newman | Feb. 4, 1936 |
| 2,339,503 | Miller | Jan. 18, 1944 |
| 2,380,829 | Eddy | July 31, 1945 |